(12) United States Patent
Östman et al.

(10) Patent No.: US 11,445,505 B2
(45) Date of Patent: Sep. 13, 2022

(54) CALIBRATION OF A SYNTHESISER IN A RADIO RECEIVER

(71) Applicant: Nordic Semiconductor ASA, Trondheim (NO)

(72) Inventors: Kjell Östman, Trondheim (NO); Mika Salmi, Trondheim (NO); Tommi Kangassuo, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 72 days.

(21) Appl. No.: 17/255,860

(22) PCT Filed: Jun. 20, 2019

(86) PCT No.: PCT/EP2019/066389
§ 371 (c)(1),
(2) Date: Dec. 23, 2020

(87) PCT Pub. No.: WO2020/002131
PCT Pub. Date: Jan. 2, 2020

(65) Prior Publication Data
US 2021/0266899 A1    Aug. 26, 2021

(30) Foreign Application Priority Data
Jun. 29, 2018   (GB) .................................. 1810760

(51) Int. Cl.
*H04W 72/04*   (2009.01)
*H04B 1/7136*  (2011.01)
(Continued)

(52) U.S. Cl.
CPC ...... *H04W 72/0453* (2013.01); *H04B 1/7136* (2013.01); *H04L 5/0012* (2013.01); *H04L 7/0331* (2013.01); *H04B 2001/71365* (2013.01)

(58) Field of Classification Search
CPC .. H04W 72/0453; H04W 4/70; H04B 1/7136; H04B 2001/71365; H04L 5/0012;
(Continued)

(56) References Cited

U.S. PATENT DOCUMENTS

| | | | |
|---|---|---|---|
| 8,503,503 B1 * | 8/2013 | Tsang ................... | H04B 1/7136 375/135 |
| 2003/0216122 A1 * | 11/2003 | Cordone ................ | H04B 1/123 455/213 |

(Continued)

FOREIGN PATENT DOCUMENTS

WO   WO 2018/064483 A1   4/2018

OTHER PUBLICATIONS

International Search Report and Written Opinion for PCT/EP2019/066389, dated Oct. 23, 2019, 15 pages.
(Continued)

*Primary Examiner* — Benjamin H Elliott, IV
(74) *Attorney, Agent, or Firm* — Klarquist Sparkman, LLP

(57) ABSTRACT

A method of operating a radio receiver arranged to receive a plurality of data symbols transmitted on one of a predetermined set of frequencies. The method comprises receiving a first set of data symbols at a first transmission frequency. The first set of data symbols comprises a message indicating a first frequency sub-set. A synthesiser is calibrated for the one or more frequencies in the first frequency sub-set. A second set of data symbols transmitted on at least one of said one or more frequencies from the first sub-set is received. It is determined from the second set of data symbols whether a network quality metric exceeds a threshold. The synthesiser is calibrated for one or more frequencies in a second frequency sub-set when the network quality
(Continued)

metric exceeds the threshold. The second sub-set comprises frequencies that are not in the first sub-set.

14 Claims, 6 Drawing Sheets

(51) Int. Cl.
  *H04L 5/00* (2006.01)
  *H04L 7/033* (2006.01)
(58) Field of Classification Search
  CPC .... H04L 7/0331; H04L 67/12; H04J 11/0073; H04J 11/0076; H04J 2013/0096; H04J 13/00
  See application file for complete search history.

(56) References Cited

U.S. PATENT DOCUMENTS

| | | | | |
|---|---|---|---|---|
| 2009/0088113 | A1* | 4/2009 | Marsili | H04B 1/7136 |
| | | | | 331/49 |
| 2009/0109564 | A1* | 4/2009 | Graef | G11B 5/09 |
| | | | | 360/51 |
| 2012/0281565 | A1* | 11/2012 | Sauer | H04B 7/0413 |
| | | | | 370/252 |
| 2013/0113535 | A1* | 5/2013 | Haralabidis | H03L 7/1974 |
| | | | | 327/157 |
| 2015/0156048 | A1* | 6/2015 | Wu | H04L 25/0204 |
| | | | | 375/349 |
| 2015/0171848 | A1* | 6/2015 | Bruennert | H03K 5/14 |
| | | | | 327/276 |
| 2018/0098321 | A1* | 4/2018 | Chae | H04B 7/26 |
| 2019/0081594 | A1* | 3/2019 | Kumar | H04L 5/14 |
| 2021/0266899 | A1* | 8/2021 | Östman | H04B 1/7136 |

OTHER PUBLICATIONS

IPO Search Report under Section 17(5) for application GB 1810760. 7, dated Dec. 28, 2018, 3 pages.
LG Electronics: "CSI feedback for low complexity UEs", 3GPP Draft; R1-155372 CSI Feedback for Low Cost MTC, 3rd Generation Partnership Project (3GPP), Mobile Competence Centre ; 650, Route Des Lucioles ; F-06921 Sophia-Antipolis Cedex ; France, vol. RAN WG1, No. Malmo, Sweden; Oct. 5, 2015-Oct. 9, 2015, Oct. 4, 2015 (Oct. 4, 2015), XP051039657, Retrieved from the Internet: URL:http://www.3gpp.org/ftp/Meetings_3GPP_ SYNC/RAN1/Docs/ [retrieved on Oct. 4, 2015].
Sony: "CSI Measurement for LC-MTC", 3GPP Draft; R1-155613, 3rd Generation Partnership Project (3GPP), Mobile Competence Centre ; 650, Route Des Lucioles ; F-06921 Sophia-Antipolis Cedex; France, vol. RAN WG1, No. Malmo, Sweden; Oct. 5, 2015-Oct. 9, 2015, Oct. 4, 2015 (Oct. 4, 2015), XP051002477, Retrieved from the Internet: URL:http://www.3gpp.org/ftp/Meetings_ 3GPP_ SYNC/RAN1/Docs/ [retrieved on Oct. 4, 2015].
Texas Instruments, White Paper, "CC2500 Low-Cost Low-Power 2.4 GHz RF Transceiver," © 1997, 97 pages.

* cited by examiner

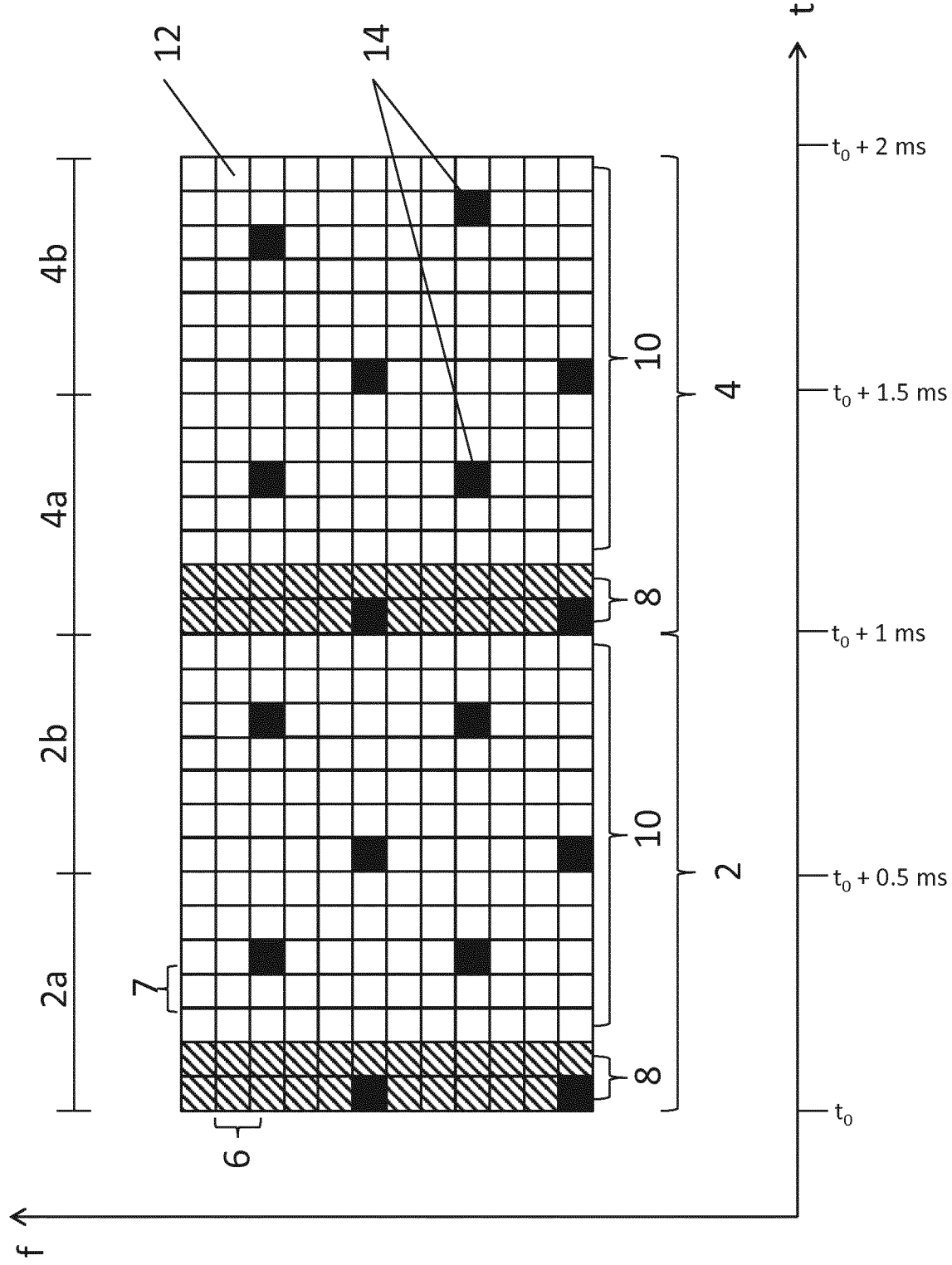

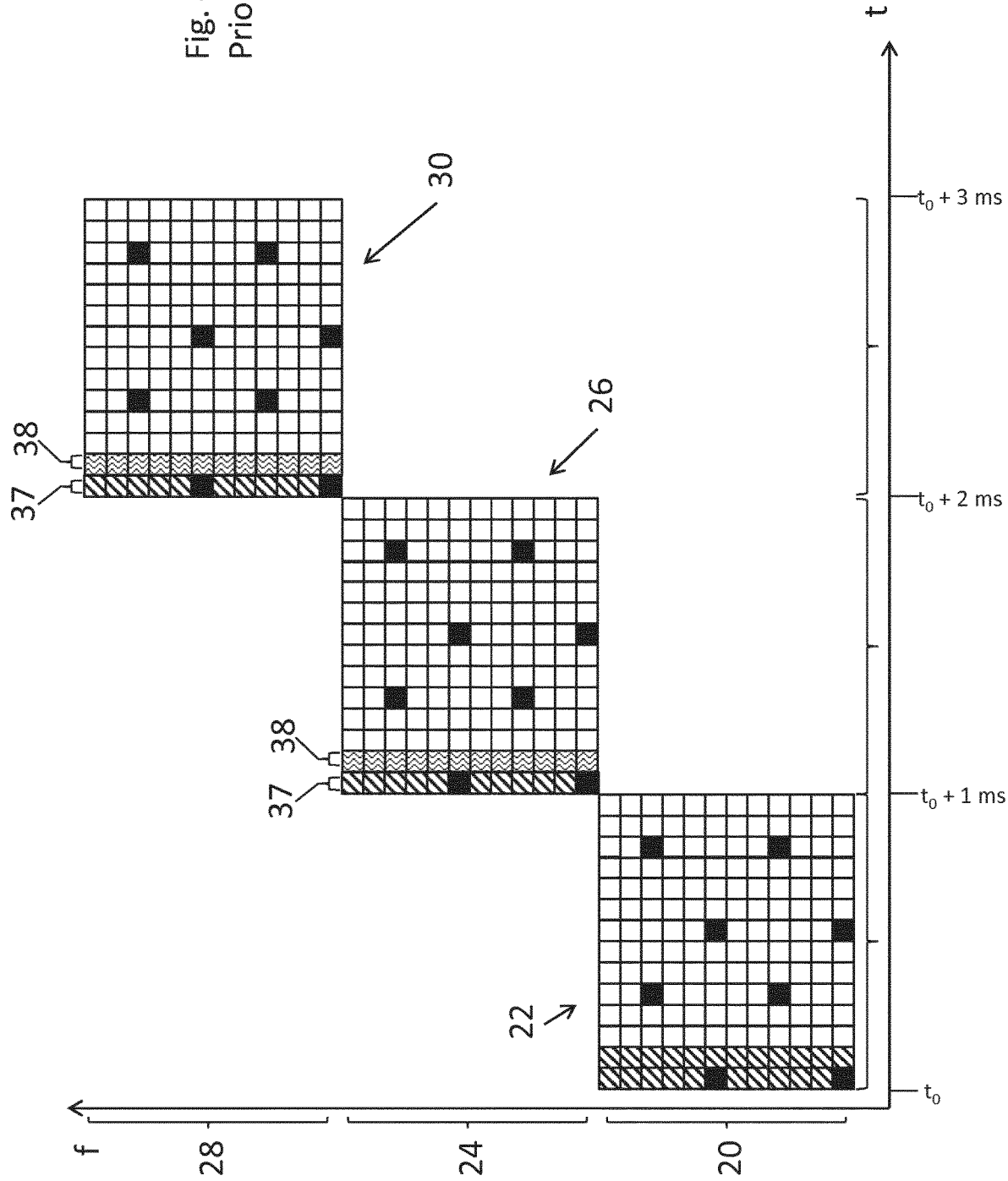

CALIBRATION OF A SYNTHESISER IN A RADIO RECEIVER

CROSS REFERENCE TO RELATED APPLICATIONS

This is the U.S. National Stage of International Application No. PCT/EP2019/066389, filed Jun. 20, 2019, which was published in English under PCT Article 21(2), which in turn claims the benefit of Great Britain Application No. 1810760.7, filed Jun. 29, 2018.

TECHNICAL FIELD

The present invention relates to improving the efficiency at which a radio receiver can carry out a calibration procedure, particularly although not exclusively, in cellular-based systems such as Long Term Evolution (LTE) systems suited for Internet of Things applications.

BACKGROUND

Throughout the course of recent years, the extent and technical capabilities of cellular-based radio communication systems have expanded dramatically. More recently, the Long Term Evolution (LTE) network, a fourth generation (or "4G") network standard specified by the $3^{rd}$ Generation Partnership Project (3GPP), has gained popularity due to its relatively high uplink and downlink speeds and larger network capacity compared to earlier 2G and 3G networks. More accurately, LTE is the access part of the Evolved Packet System (EPS), a purely Internet Protocol (IP) based communication technology in which both real-time services (e.g. voice) and data services are carried by the IP protocol.

However, while "classic" LTE connections are becoming increasingly prevalent in the telecommunications industry, further developments to the communication standard are being made in order to facilitate the so-called "Internet of Things" (IoT), a common name for the inter-networking of physical devices, sometimes called "smart devices", providing physical objects that may not have been connected to any network in the past with the ability to communicate with other physical and/or virtual objects. Such smart devices include: vehicles; buildings; household appliances, lighting, and heating (e.g. for home automation); and medical devices. These smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices, thus providing "machine-to-machine" (or "machine type") communication. However, the development of the LTE standards makes it more practical for them to connect directly to the cellular network.

3GPP have specified two versions of LTE for such purposes in Release 13 of the LTE standard. The first of these is called "NarrowBand IoT" (NB-IoT), sometimes referred to as "LTE Cat NB1", and the second is called "enhanced Machine Type Communication" (eMTC), sometimes referred to as "LTE Cat M1". It is envisaged that the number of devices that utilise at least one of these standards for IoT purposes will grow dramatically in the near future.

From a communications perspective, LTE standards (including NB-IoT and eMTC) use orthogonal frequency division multiple access (OFDMA) as the basis for allocating network resources. This allows the available bandwidth to be shared between user equipment (UE) that accesses the network in a given cell, provided by a base station, referred to in LTE as an "enhanced node B", "eNodeB", or simply "eNB". OFDMA is a multi-user variant of orthogonal division multiplexing (OFDM), a multiplexing scheme in which the total bandwidth is divided into a number of non-overlapping sub-bands, each having its own sub-carrier frequency. In OFDM, unlike other frequency division multiplexing (FDM) schemes, each of these sub-carriers are orthogonal to one another such that cross-talk between sub-bands is ideally eliminated and removing the need for inter-carrier guard bands.

In order to achieve this orthogonality, the spacing $\Delta f$ between the sub-carriers is set such that $$\Delta f = \frac{k}{T_U},$$

where $T_U$ is the "useful symbol duration" (the receiver-side window size) and k is a positive integer (and is usually set to 1). Therefore with N sub-carriers, the total bandwidth B can be expressed as $B = N\Delta f$. These sub-carriers are then shared between multiple users, thus providing multiple access. This spacing $\Delta f$ between the sub-carriers is commonly referred to as the subcarrier spacing'. In LTE, the sub-carrier spacing is typically 15 kHz.

At the physical layer, in the downlink of an LTE connection, each data frame is 10 ms long and is constructed from ten sub-frames, each of 1 ms duration. Each sub-frame contains two slots of equal length, i.e. two 0.5 ms slots. Each slot (and by extension, each sub-frame and each frame) will typically contain a certain number of "resource blocks" (where each sub-frame has twice as many resource-blocks as a slot and each frame has ten times as many resource blocks as a sub-frame). A resource block is 0.5 ms long in the time domain and is twelve sub-carriers wide in the frequency domain. Generally speaking, there are seven OFDM symbols per slot and thus fourteen OFDM symbols per sub-frame. These resource blocks can be visualised as a grid of "resource elements", where each resource element is $\frac{1}{14}$ ms long and one sub-carrier wide, such that there are eighty-four resource elements per resource block (i.e. seven multiplied by twelve) and one hundred and sixty-eight resource elements per sub-frame.

The exact number of resource blocks that exist in each slot (and by extension, each sub-frame and each frame) depends on the bandwidth configuration of the radio communication system. For example, in LTE eMTC Release 13, the LTE radio channel may have a bandwidth of 1.4 MHz, 3 MHz, 5 MHz, 10 MHz, or 20 MHz, where the channel is divided up into narrowbands of 1.4 MHz width.

In LTE eMTC, communications undergo a 'frequency hopping' process in which communications between the eNodeB and the user equipment (UE) 'jump' between different narrowbands within the LTE channel, potentially changing narrowband as frequently as every sub-frame, where the frequency hopping schedule is set by the network and communicated to the UE.

Typically, an LTE receiver (e.g. a UE) uses a local oscillator (LO) to produce a reference signal that is used in order to receive and demodulate incoming radio signals. This reference signal must generally be of the same frequency as the frequency of the narrowband currently in use. The LO frequency may be synthesized using a voltage controlled oscillator (VCO), where a phase locked loop (PLL) is used to tune the VCO frequency to a rational multiple of the frequency of a high accuracy reference oscillator.

As a VCO typically oscillates at a very high frequency, a VCO-based synthesiser may be sensitive to a number of parameters, such as temperature, operating voltage, etc. In order to ensure correct operation and optimal performance, it is important to calibrate the VCO for operation for the particular frequency in use. One arrangement, known in the art per se, first calibrates the VCO frequency to be in the middle of its voltage tuning range such that the PLL and automatic frequency control (AFC) have maximum frequency space to control the VCO whilst keeping it within the tuning range. However, the Applicant has appreciated that performing the calibration in this way increases the total synthesiser switching time, i.e. increases the time taken in order to switch from one operating frequency to another, which happens, for example, when frequency hopping takes place. Furthermore, the VCO is in an undetermined transient state during the calibration. Calibrating the VCO in this way may therefore be problematic for LTE eMTC communications, in which the UE may be expected, in continuous reception mode, to change the LO frequency during the OFDM symbols that are typically used by legacy LTE for the physical downlink control channel (PDCCH). Due to the calibration taking some time, it may not be guaranteed that the synthesiser frequency can be changed in a single OFDM symbol period.

The Applicant has appreciated one possible arrangement in which calibration of the VCO can be run in advance for all of the possible frequencies that may be used, and the results of the calibration stored in memory and the relevant calibration information retrieved when changing frequency. The CC2500 chip by Texas Instruments® uses a similar approach for calibrating a VCO for frequency hopping in 2.4 GHz communication protocols. However, the Applicant has appreciated that while such an approach may be appropriate for some wireless communication protocols, such an approach may become prohibitively onerous when the number of possible frequencies is large.

This problem is compounded because any calibration of a VCO may only be useful for a certain length of time. As outlined above, the VCO calibration is sensitive to various factors including temperature and operating voltage, which may vary in use. As such, re-calibrating the VCO for all of the possible frequencies take more time and processing power than is desirable, particularly for battery-powered devices.

SUMMARY OF THE INVENTION

When viewed from a first aspect, the present invention provides a method of operating a radio receiver device arranged to receive a plurality of data symbols transmitted on one or more frequencies from a predetermined set of frequencies, the method comprising:
  receiving a first set of data symbols at a first transmission frequency, wherein said first set of data symbols comprises a message indicating a first frequency sub-set comprising one or more frequencies selected from said predetermined set of frequencies;
  calibrating a synthesiser for the one or more frequencies in said first frequency sub-set;
  receiving a second set of data symbols transmitted on at least one of said one or more frequencies from the first sub-set;
  determining from the second set of data symbols whether a network quality metric exceeds a threshold;
  calibrating the synthesiser for one or more frequencies in a second frequency sub-set when the network quality metric exceeds the threshold, wherein the second frequency sub-set comprises frequencies of the predetermined set of frequencies that are not in the first frequency sub-set.

This first aspect of the invention extends to a radio receiver device arranged to receive a plurality of data symbols transmitted on one or more frequencies from a predetermined set of frequencies, said radio receiver device comprising a synthesiser, wherein the radio receiver device is arranged to:
  receive a first set of data symbols at a first transmission frequency, wherein said first set of data symbols comprises a message indicating a first frequency sub-set comprising one or more frequencies selected from said predetermined set of frequencies;
  calibrate the synthesiser for the one or more frequencies in said first frequency sub-set;
  receive a second set of data symbols transmitted on at least one of said one or more frequencies from the first sub-set;
  determine from the second set of data symbols whether a network quality metric exceeds a threshold; and
  calibrate the synthesiser for one or more frequencies in a second frequency sub-set when the network quality metric exceeds the threshold, wherein the second frequency sub-set comprises frequencies of the predetermined set of frequencies that are not in the first frequency sub-set.

This first aspect of the invention extends to a radio communication system comprising a radio transmitter device and a radio receiver device, wherein:
  the radio transmitter device comprises a synthesiser and is arranged to transmit a plurality of data symbols on one or more frequencies from a predetermined set of frequencies;
  wherein the radio receiver device is further arranged to:
  receive a first set of data symbols at a first transmission frequency, wherein said first set of data symbols comprises a message indicating a first frequency sub-set comprising one or more frequencies selected from said predetermined set of frequencies;
  calibrate the synthesiser for the one or more frequencies in said first frequency sub-set;
  receive a second set of data symbols transmitted on at least one of said one or more frequencies from the first sub-set;
  determine from the second set of data symbols whether a network quality metric exceeds a threshold; and
  calibrate the synthesiser for one or more frequencies in a second frequency sub-set when the network quality metric exceeds the threshold, wherein the second frequency sub-set comprises frequencies of the predetermined set of frequencies that are not in the first frequency sub-set.

Thus it will be appreciated by those skilled in the art that embodiments of the present invention provide an improved method of operating a radio receiver device (together with an associated radio receiver device and radio communication system comprising such a radio receiver device) in which the calibration of the synthesiser for different frequencies is split into multiple rounds. The advantages of carrying out the calibration in advance (rather than during any frequency hopping process when switching to a new frequency) are still observed, i.e. the receiver may quickly change frequency without being required to calibrate its synthesiser in a relatively short time-window. However, compared to conventional approaches to calibration of a synthesiser ahead of frequency hopping known in the art per se, a radio receiver device operating in accordance with embodiments of the present invention may save time and/or power by calibrating for all of the possible transmission frequencies only if the network is suitable, i.e. if the network quality metric is sufficient.

Those skilled in the art will appreciate that in some communication protocols, for example LTE based communications, receipt of some initial data provides the receiver with information about the transmission channel, where this initial data is only ever transmitted on a select few of the possible transmission frequencies used by a transmitter. The Applicant has appreciated that the radio receiver device may advantageously be calibrated only for a sub-set of the possible transmission frequencies, at least initially, in order to receive the set of data symbols from which the receiver determines whether or not the network is suitable. If the network is suitable (i.e. if the network quality metric exceeds the threshold), calibration may then be carried out for the other frequencies in the set. However, if the network is unsuitable (i.e. if the network quality metric does not exceed the threshold), the receiver may not carry out any further calibration for the other frequencies, thus saving power.

The Applicant has appreciated that sometimes an LTE UE, despite several attempts, may simply fail to decode the system information blocks (SIBs) it needs (SIB1 and SIB2), in which case it may have to revert back to a cell search procedure. Otherwise, the UE may typically decode the SIBs. There are usually a large number of SIBs, carrying various information. The UE typically decodes these in due order (SIB1 may provide the position in time and frequency of SIB2, which in turn may provide the time and frequency of SIB3 etc.). Sometimes an SIB may provide time and frequency of several subsequent SIBs). However, the Applicant has appreciated that many of these SIBs may carry information that causes the UE to abandon the cell, for instance if the cell belongs to a non-preferred operator. In an alternative example, the cell could simply be barred from use. If this happens, the UE may resume the cell search procedure.

If all SIB information is acceptable (e.g. if the cell belongs to a preferred operator and is not barred from use), one of the SIBs carries information on the parameters of the neighbouring cells. In due time, the UE may perform periodic measurements on these neighbouring cells to determine whether any of the neighbouring cells carry a stronger signal (or better SNR), in which case the UE will eventually switch to this neighbouring cell and start the whole SIB procedure again. However, if none of the neighbour cells has better signal strength than the current cell (or there simply are no neighbour cells listed), and the current cell does not fulfil the network quality metric, then the UE may revert to the cell search procedure.

The network quality metric may be any suitable metric known in the art per se for determining whether the network is suitable for connection. However, in some embodiments, the network quality metric comprises a signal to noise ratio. In some potentially overlapping embodiments, the network quality metric comprises a block error rate. In some further potentially overlapping embodiments, the network quality metric comprises a bit error rate. In a set of embodiments, these network quality metrics may be combined such that a plurality of network quality metrics are each compared to a corresponding threshold in order to determine whether the network is suitable for connection.

While the principles of the claimed invention may apply to a number of different radio communication protocols that provide such information on a selected sub-set of the transmission frequencies, in at least some preferred embodiments, the radio receiver device (and, where appropriate, the radio transmitter device) is arranged to carry out cellular radio communications, preferably LTE radio communications, and most preferably LTE eMTC and/or NB-IoT communications.

The Applicant has appreciated that in LTE communications, for example in LTE eMTC communications, the receiver may initially search for primary synchronisation signals (PSS) and secondary synchronisation signals (SSS) in order to find the cellular network, and subsequently receive the physical broadcast control channel (PBCH) which includes the master information block (MIB). Those skilled in the art will appreciate that the system bandwidth is not generally known by the receiver until the MIB is received. As outlined above, in LTE eMTC Release 13, the LTE radio channel may have a bandwidth of 1.4 MHz, 3 MHz, 5 MHz, 10 MHz, 15 MHz or 20 MHz, where the channel is divided up into narrowbands of 1.4 MHz width. Therefore, the total number of frequencies that the receiver needs to calibrate the synthesiser for depends on the system bandwidth, i.e. the number of narrowbands being used. An LTE system using 10 MHz of bandwidth provides eight narrowbands while a system using 20 MHz of bandwidth provides sixteen narrowbands.

Furthermore, the number of narrowbands that are used for the transmission of further system information which may be needed by the receiver typically depends on the system bandwidth in LTE eMTC, where this further system information may be the LTE system information block 1 (SIB1-BR). For example, if the bandwidth is greater than 10 MHz, there may be four possible frequencies on which this further system information is located. Conversely, for lower bandwidths, there may only be one or two such frequencies on which the further system information may be located. The radio receiver device may then determine from this further system information whether or not the network is suitable for connection and determine whether to calibrate for the other narrowband frequencies or whether to take no further action. In a system that uses 20 MHz of bandwidth and thus provides sixteen narrowbands, by only initially calibrating the synthesiser for four narrowbands, the quality of the network can be determined before calibration of the other twelve narrowband frequencies is carried out, thus saving time and power compared to calibrating for all sixteen narrowband frequencies immediately.

In some embodiments, calibrating the synthesiser comprises storing calibration information associated with each frequency for which the synthesiser is calibrated in a memory, wherein the radio receiver device is arranged to retrieve said calibration information when switching to the associated frequency. The radio receiver device may, as outlined above, switch frequency intermittently, for example periodically (i.e. with a fixed period of, e.g., every 1 ms corresponding to switching every sub-frame in LTE communications).

It will be appreciated by those skilled in the art that there are a number of synthesisers, known in the art per se, that could readily be used in the radio receiver device. However, in some embodiments, the synthesiser comprises an oscillator circuit portion. In a preferred set of such embodiments, the oscillator circuit portion comprises a phase-locked loop arrangement comprising a voltage controlled oscillator (VCO) and a phase detector arranged in a loop, wherein the phase detector is arranged to produce an error signal that depends on a difference between a frequency produced by the voltage controlled oscillator and a reference frequency, wherein the frequency produced by the voltage controlled oscillator depends on the error signal.

Those skilled in the art will appreciate that the frequency produced by a VCO is, as suggested by the name, controlled through a voltage applied to an input of the VCO, in this case the error signal produced by the phase detector. In some embodiments, the oscillator circuit portion comprises a filter, preferably a low-pass filter, situated between the phase detector and the voltage controlled oscillator and is arranged to filter the error signal to produce a filtered error signal, wherein the frequency produced by the voltage controlled oscillator depends on the filtered error signal.

The reference frequency may, in some embodiments, be produced by a crystal oscillator. Those skilled in the art will appreciate that crystal oscillators may produce a relatively stable frequency, however the maximum frequency that may be produced by such a crystal oscillator is typically much less than the frequency required of the voltage controlled oscillator. In a potentially overlapping set of embodiments, the oscillator circuit portion comprises a frequency divider situated between the phase detector and the voltage controlled oscillator arranged to divide the frequency produced by the voltage controlled oscillator to produce a divided frequency, wherein the error signal depends on a difference between the divided frequency and the reference frequency. This may advantageously extend the range of frequencies that may be produced to multiples of the reference frequency.

In a set of such embodiments, the voltage controlled oscillator comprises a plurality of capacitors arranged to form a capacitor matrix, wherein a control signal applied to the capacitor matrix may selectively enable one or more of the capacitors such that a capacitance of the capacitor matrix is varied, wherein the frequency produced by the voltage controlled oscillator depends on the capacitance of the capacitor matrix.

In some such embodiments, the step of calibrating the synthesiser comprises:
  disconnecting the voltage controlled oscillator from the phase locked loop arrangement;
  applying a fixed control voltage to the input of the voltage controlled oscillator;
  varying the capacitance of the capacitor matrix;
  measuring the frequency produced by the voltage controlled oscillator for plurality of different capacitance values of the capacitor matrix; and
  determining an optimal capacitance value for the capacitor matrix by comparing the frequency produced by the voltage controlled oscillator to a calibration reference frequency. In some such embodiments, the calibration reference frequency is the same as the reference frequency used in normal operation, i.e. when the VCO is connected to the phase detector such that the PLL is complete.

While the calibration of the synthesiser may be relied on for some time, those skilled in the art will appreciate that the calibration may become less reliable as factors such as the temperature and/or the operating voltage vary during operation of the radio receiver device. Accordingly, in some embodiments, the method comprises calibrating the synthesiser for one or more frequencies of the predetermined set of frequencies before receiving a further set of data symbols. It will be appreciated by those skilled in the art that while the further set of data symbols occur later than the second set of data symbols (which, in turn, occur later than the first set of data symbols), the further set of data symbols which are preceded by the recalibration process do not necessarily follow the second set of data symbols immediately.

The recalibration process may be carried out intermittently throughout operation of the radio receiver device. For example, in some embodiments, the method comprises calibrating the synthesiser for one or more frequencies of the predetermined set of frequencies before receiving the further set of data symbols if a predetermined time period has elapsed since the previous calibration of the synthesiser.

However, in some potentially overlapping embodiments the method comprises comparing an operating temperature of the radio receiver device to a reference temperature and calibrating the synthesiser for one or more frequencies of the predetermined set of frequencies before receiving the further set of data symbols when a difference between the operating temperature and the reference temperature exceeds a temperature difference threshold. In a further set of potentially overlapping embodiments, the method comprises comparing an operating voltage of the radio receiver device to a reference voltage and calibrating the synthesiser for one or more frequencies of the predetermined set of frequencies before receiving the further set of data symbols when a difference between the operating voltage and the reference voltage exceeds a voltage difference threshold. Thus in some embodiments, a measurement of one or more operating parameters may be taken and a determination may be made from that measurement as to whether recalibration is necessary.

While the radio receiver device may, in some arrangements, be arranged only to receive data, in at least in some embodiments, the radio receiver device is a radio transceiver device further arranged to transmit a plurality of data symbols transmitted on one or more frequencies from the predetermined set of frequencies.

BRIEF DESCRIPTION OF DRAWINGS

Certain embodiments of the invention will now be described, by way of non-limiting example only, with reference to the accompanying drawings in which:
FIG. 3 is a diagram of two typical, consecutive LTE sub-frames;
FIG. 4 is a diagram showing a prior art frequency hopping process.

DETAILED DESCRIPTION

Figure 1:
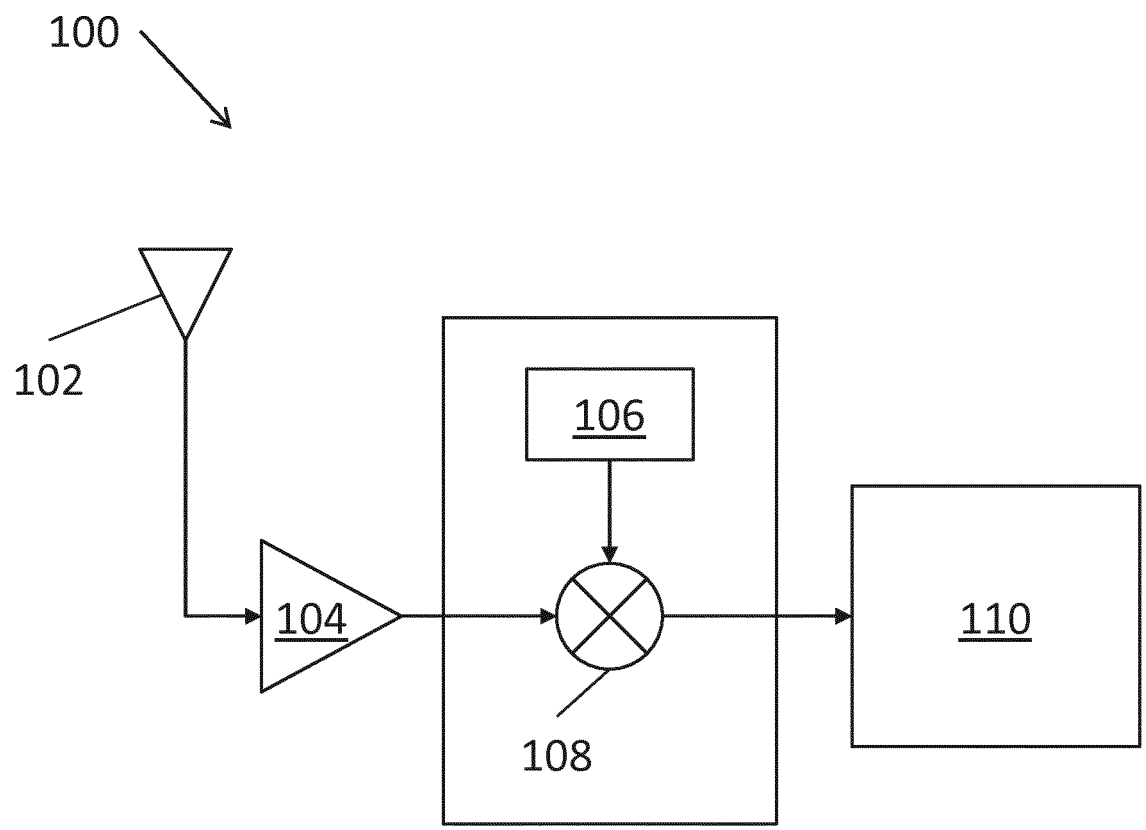
FIG. 1 is a block diagram of a typical LTE eMTC receiver.

FIG. 1 is a block diagram of a typical LTE eMTC receiver 100, known in the art per se. The receiver 100 comprises: an antenna 102; a low-noise amplifier (LNA) 104; a frequency synthesiser 106; a mixer 108; and a demodulation module 110. Those skilled in the art will appreciate that this is a highly simplified overview of a practical system, which would typically contain many subsystems.

Signals received via the antenna 102 are passed through the LNA 104 which amplifies the signals before inputting them to the mixer 108. The mixer 108 also takes as an input a signal produced by the frequency synthesiser 106 in order to down-mix the received signals from the transmission frequency to baseband frequency suited to further processing by the demodulation module 110.

In order to change between different radio channels, for example during a frequency hopping process, the frequency synthesiser 106 can be tuned to change the frequency of the signal it produces that is input to the mixer 108 to match the frequency being used by the transmitter (e.g. an eNodeB). The synthesiser 106 includes an oscillator circuit portion including a voltage controlled oscillator (VCO) arranged in a phase locked loop (PLL) in a manner known in the art per se, described in further detail below.

Figure 2A:
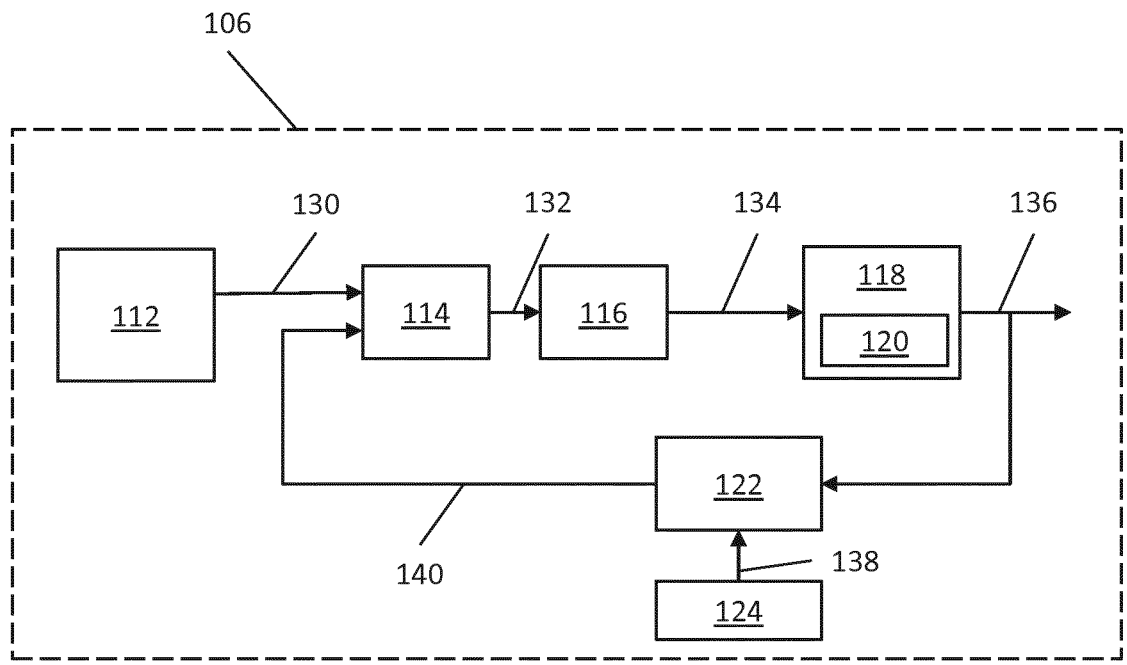
FIGS. 2A and 2B are block diagrams of the VCO-based synthesiser used in the receiver of FIG. 1, illustrating normal operation and calibration of the synthesiser.
Figure 2B:
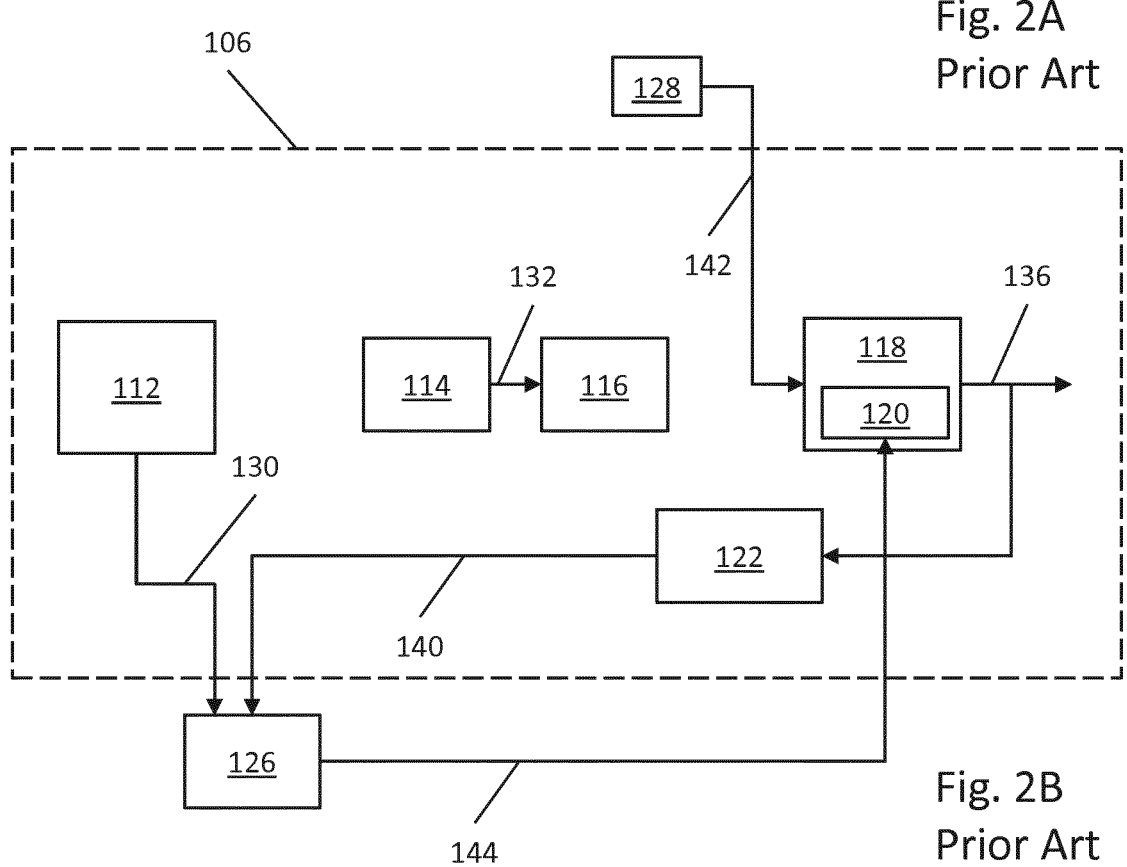

FIGS. 2A and 2B are block diagrams of the VCO-based synthesiser 106 used in the LTE eMTC receiver 100 of FIG. 1, illustrating normal operation and calibration of the synthesiser 106 respectively. The synthesiser 106 comprises: a crystal oscillator 112; a phase detector 114; a low-pass filter 116; a VCO 118 including a capacitor matrix 120; a frequency divider 122; and an automatic frequency control (AFC) module 124. As can be seen in FIG. 2B a calibration unit 126, together with a fixed control voltage source 128, can be used for the calibration of the synthesiser 106 as outlined below.

The crystal oscillator 112 provides a reference signal 130 which is input to the phase detector 114. The phase detector 114 provides an error signal 132 that is filtered by the low-pass filter 116, resulting in a filtered error signal 134. This filtered error signal 134 is input to the VCO 118, which produces a signal 136 at a frequency that depends on the filtered error signal 134 (and thus depends on the error signal 132).

The signal 136 produced by the VCO 118 is divided by the frequency divider 122, where the factor by which the signal 136 is divided depends on a control signal 138 supplied by the AFC module 124. The resulting divided signal 140 is fed back to the phase detector 114, which compares the frequency of the divided signal 140 to the reference signal 130 produced by the crystal oscillator 112 and varies the error signal 132, where the low pass filter 116 removes high frequency components of the error signal 132 to reduce the impact of noise. Thus it will be appreciated that the arrangement shown in FIG. 2A forms a PLL, where the frequency of the signal 136 produced by the VCO 118 iteratively converges on a multiple of the frequency of the reference signal 130, where the multiple is the factor by which the frequency divider 122 divides the frequency 136 produced by the VCO 118.

For optimal control of the VCO 118, generally the VCO 118 should be initially calibrated to the middle of its voltage tuning range for a given frequency, such that control provided by the PLL and the AFC module 124 have the maximum frequency space in which to control the frequency produced by the VCO 118. The calibration process is described below with reference to FIG. 2B.

In order to calibrate the VCO 118, the VCO 118 is disconnected from the PLL as shown in FIG. 2B, such that the input of the VCO 118 is disconnected from the low pass filter 116, and thus from the phase detector 114. Instead, the VCO takes a fixed control voltage 142 produced by the control voltage source 128. The signal 136 produced by the VCO 118 is divided by the frequency divider 122 as normal, however the divided signal 140 is input to a calibration unit 126 instead, together with the reference signal 130 from the crystal oscillator 112.

The calibration unit 126 varies a control signal 144 that is supplied to the VCO 118, where the value of the control signal 144 changes the configuration of the capacitor matrix 120, which changes the capacitance of the capacitor matrix 120 presented to the VCO 118. The calibration unit 126 varies this control signal 144 across its range of possible values, comparing the divided signal 140 to the reference signal 130 in order to determine the best configuration of the capacitor matrix 120 for the current operating conditions, so that the required frequency is given by the fixed control voltage.

FIG. 3 is a diagram of two typical, consecutive LTE sub-frames as used in LTE communications. As explained previously, in accordance with the LTE standard, each LTE data frame is 10 ms long and is constructed from ten sub-frames, each of 1 ms duration. FIG. 3 shows two consecutive sub-frames 2, 4, where each sub-frame 2, 4 contains two respective slots 2a, 2b; 4a, 4b of equal length, i.e. each sub-frame has two 0.5 ms slots. Thus the first slot 2a of the first sub-frame 2 starts at $t_0$ and ends at $t_0+0.5$ ms, the second slot 2b of the first sub-frame 2 starts at $t_0+0.5$ ms and ends at $t_0+1$ ms, the first slot 4a of the second sub-frame 4 starts at $t_0+1$ ms and ends at $t_0+1.5$ ms, and the second slot 4b of the second sub-frame 4 starts at $t_0+1.5$ ms and ends at $t_0+2$ ms.

Each slot 2a, 2b, 4a, 4b contains a certain number of "resource blocks". A resource block is 0.5 ms long in the time domain and is twelve sub-carriers 6 wide in the frequency domain. Generally speaking, there are seven OFDM symbols 7 per time-domain slot 2a, 2b; 4a, 4b and thus fourteen OFDM symbols 7 per sub-frame 2, 4. These resource blocks can be visualised as a grid of "resource elements", where each resource element is $\frac{1}{14}$ ms long and one sub-carrier wide, such that there are one hundred and sixty-eight resource elements per sub-frame (i.e. fourteen multiplied by twelve).

Each sub-frame 2, 4 is further split into a control channel portion 8 and a payload portion 10. The control channel portion 8, which has a duration of the first two resource elements (i.e. the first $\frac{2}{14}$ ms), is typically used by the UE to tune its receiver frequency synthesiser to the current narrowband frequency. It will of course be appreciated that, in practice, the control channel portion 8 may have a duration of between one and four OFDM symbols.

The payload portion 10 contains the data itself such that a number of the resource elements in each frame 2, 4 contain only data symbols—i.e. the data that has been converted into OFDM symbols and transmitted by the eNodeB, over-the-air, to the UE. These data symbols are depicted in the accompanying drawings as white blocks, and an exemplary resource element carrying data is labelled 12 in FIG. 3.

A number of common reference symbols (CRS) are distributed throughout both the control channel portion 8 and payload portion 10. These CRS are used to aid demodulation of the OFDM data symbols. In general, NB-IoT and eMTC are expected to operate in very low signal-to-noise ratio (SNR) conditions and so it may be necessary to average or filter a number of these CRS in order to obtain a suitable channel estimate, i.e. an estimate of the characteristics of the channel such as attenuation, phase shifts, and noise. These CRS are depicted in the accompanying drawings as black blocks, and exemplary CRS resource elements are labelled 14 in FIG. 3.

These CRS 14 are used to demodulate the OFDM data symbols in a manner known in the art per se. In general, the averaging of the CRS 14 would be carried out using a symmetrical sliding window in both time and frequency, i.e. CRS 14 from the past and the future relative to a given data symbol are used to demodulate the data symbol (e.g. an average of the CRS 14 received in the previous five and following five OFDM data symbols relative to a resource element containing the data to be demodulated).

FIG. 4 is a diagram showing a prior art frequency hopping process. In this example, the transmission channel (i.e. the narrowband) changes every sub-frame. At a first time $t_0$, LTE communication is carried out over a first narrowband 20 (twelve sub-carriers wide as before). After 1 ms (i.e. the duration of a single sub-frame in LTE), once a first sub-frame 22 has been transmitted, the eNodeB changes its transmission frequency according to a predetermined pattern and the UE retunes its frequency synthesiser to a second narrowband 24 at $t_0+1$ ms. Those skilled in the art will of course appreciate that this is only a single example, and in practical systems the signal of interest may actually be multiple resource blocks wide. For example, an incoming signal might be between one and six resource blocks wide, and these resource blocks need not necessarily be located adjacent one another. For the sake of simplicity, the examples shown here are only a single resource block wide, however it should be understood that the principles outlined herein apply equally to signals of any width in terms of resource blocks.

Similarly, after a further 1 ms, once a second sub-frame 26 has been transmitted, the eNodeB changes its transmission frequency again and the UE retunes its frequency synthesiser to a third narrowband 28 at $t_0+2$ ms before receiving a third sub-frame 30.

When switching between these narrowbands, the LTE eMTC receiver 100 is expected to retune the synthesiser 106 during the OFDM symbols 38 typically used in legacy LTE systems for the physical downlink control channel (PDCCH). As the VCO typically oscillates at a very high frequency, the VCO-based synthesiser 106 may be sensitive to a number of parameters, such as temperature, operating voltage, etc. In order to ensure correct operation and optimal performance, it is important to calibrate the VCO for operation for the particular frequency in use, i.e. the frequency of the narrowband 20, 24, 28 in use.

In conventional arrangements described above with reference to FIGS. 2a and 2b, calibration of the synthesiser 106 comprises calibrating the VCO frequency to be in the middle of its voltage tuning range such that the PLL and AFC have maximum frequency space to control the VCO whilst keeping it within the tuning range. However, performing the calibration in this way increases the total switching time of the synthesiser 106, i.e. increases the time taken in order to switch from one operating frequency to another, which happens, for example, when frequency hopping takes place. Furthermore, the VCO 118 is in an undetermined transient state during the calibration.

Calibrating the VCO in this way is potentially problematic for LTE eMTC communications as outlined above where the UE is expected to change the LO frequency during the OFDM symbols 38 that are typically used by legacy LTE for the physical downlink control channel (PDCCH). Due to the calibration taking some time, it may not be guaranteed that the synthesiser frequency can be changed in a single OFDM symbol period. It will be appreciated that the OFDM symbols 37 immediately preceding the marked OFDM symbols 38 could also be used for the change in LO frequency, however the OFDM symbols 37 immediately preceding those marked include CRS which could be used for demodulation, and thus the Applicant has appreciated that it is generally advantageous to change the LO frequency during the OFDM symbols 38 marked on FIG. 4. Those skilled in the art will appreciate that when CRS in symbol 38 of subframe 26 is used for demodulation, it would be in the demodulation of subframe 22 (i.e. would use a "continuation" of subframe 22 on narrowband 20 which is not visible in the figure, but which is there because CRS are transmitted by LTE on all narrowbands all the time).

Conventional LTE receivers, known in the art per se, that require more than one OFDM symbol duration to change the LO frequency typically use both the OFDM symbols 38 marked and the OFDM symbols 37 immediately preceding the marked symbols.

Figure 5:
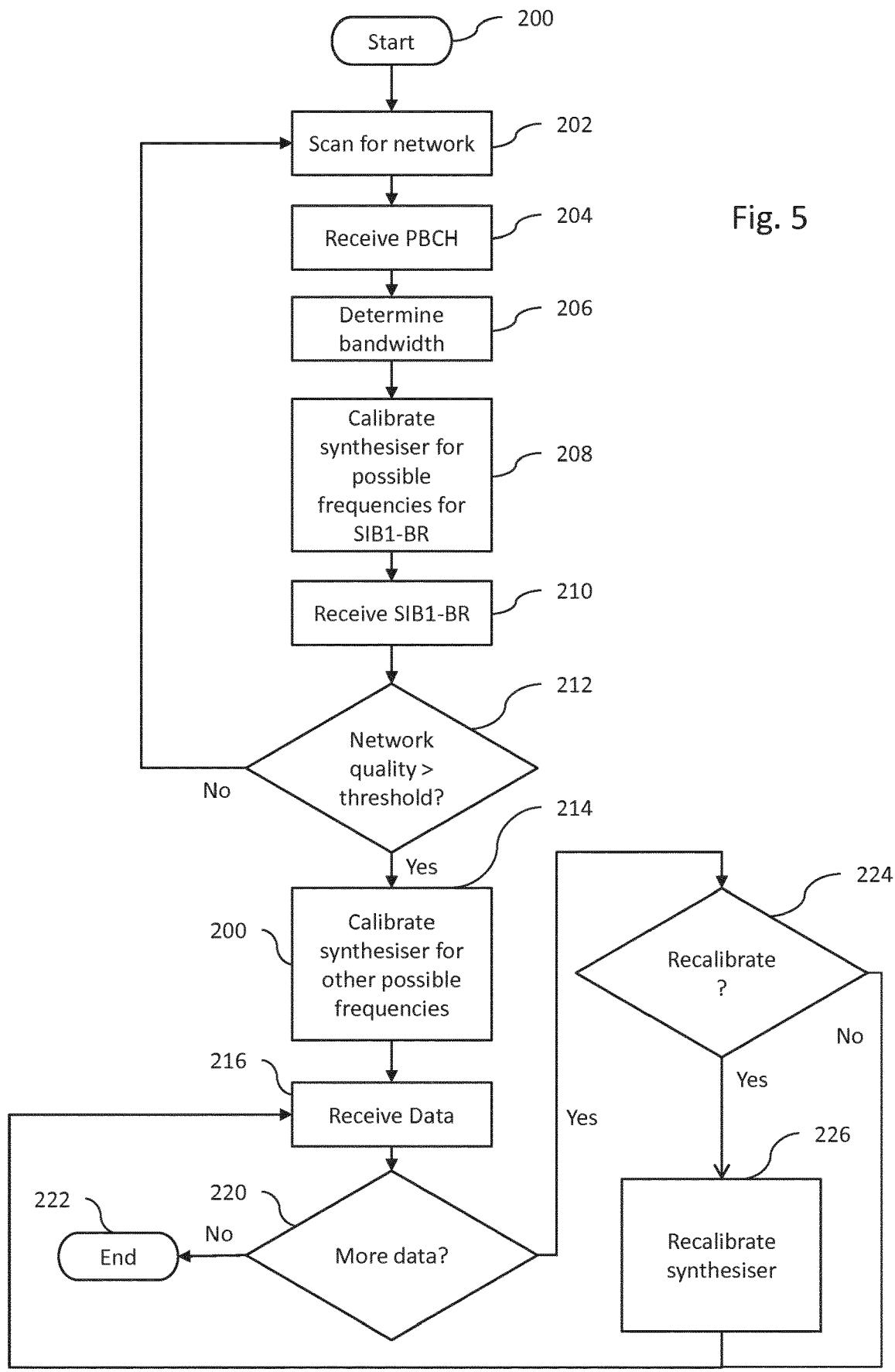
FIG. 5 is a flowchart illustrating a method of operating an LTE eMTC receiver in accordance with an embodiment of the claimed invention.
Figure 6:
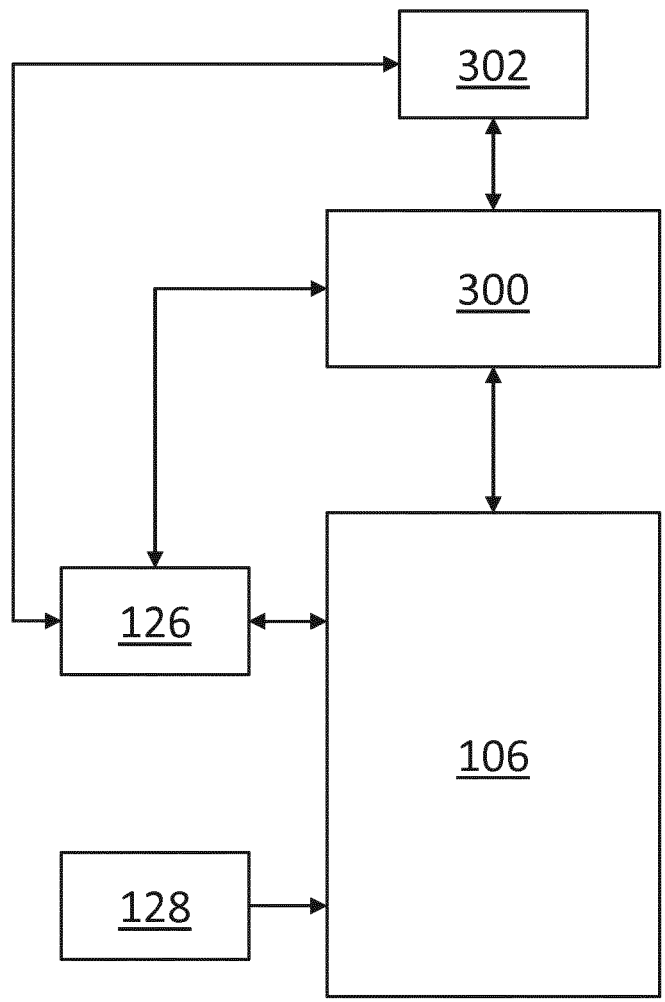
FIG. 6 is a block diagram of an LTE eMTC receiver arranged to carry out the method shown in FIG. 5 according to an embodiment of the claimed invention.

FIG. 5 is a flowchart illustrating a method of operating the LTE eMTC receiver 100 in accordance with an embodiment of the claimed invention. The process described with reference to FIG. 5 may be carried out by any suitable processing arrangement, but in this exemplary embodiment is carried out by a processor 300, as shown in FIG. 6. As can be seen in this block diagram, the processor 300 is connected to the synthesiser 106, and communicates with the calibration unit 126. Calibration information is stored in a memory 302, as outlined in further detail below.

Referring back to FIG. 5, the process is started at step 200 and, after initialisation, the receiver 100 starts to scan for a network at step 202, by scanning for PSS and SSS transmissions from an eNodeB across the entire frequency range. Once a network has been detected, the receiver 100 receives the PBCH transmission from the eNodeB at step 204. This PBCH transmission received at step 204 is a first set of OFDM data symbols which are transmitted at a first transmission frequency (i.e. the channel frequency) and include in the payload the master information block (MIB) which indicates the bandwidth being used by the network.

Once the eMTC receiver 100 has determined the bandwidth at step 206 from the MIB received via the PBCH transmission from the eNodeB, the receiver 100 can determine which set of frequencies the SIB1-BR message may be transmitted on by the eNodeB. The LTE radio channel may have a bandwidth of 1.4 MHz, 3 MHz, 5 MHz, 10 MHz, 15 MHz, or 20 MHz, where the channel is divided up into narrowbands of 1.4 MHz width. For example, an LTE system using 10 MHz of bandwidth provides eight narrowbands, a system using 15 MHz of bandwidth provides twelve narrowbands, and a system using 20 MHz of bandwidth provides sixteen narrowbands.

Those skilled in the art will appreciate that the number of narrowbands that are used for the transmission of the SIB1-BR message also depends on the bandwidth. For example, if the bandwidth is 15 MHz or 20 MHz, there are typically four possible frequencies on which the SIB1-BR transmission may occur. If the bandwidth is 3 MHz, 5 MHz, or 10 MHz, there are typically two possible frequencies for the SIB1-BR transmission. Conversely, if the bandwidth is 1.4 MHz, there is only a single frequency on which the SIB1-BR transmission may be located.

Once the receiver device has determined the bandwidth, at step 208 the receiver 100 calibrates the synthesiser 106, in the manner described previously with reference to FIGS. 2A and 2B, for each of the possible frequencies that the SIB1-BR message can be transmitted on for the bandwidth in use and stores these in a memory. At step 210, the receiver 100 receives the SIB1-BR message on one of the frequencies that the synthesiser 106 is calibrated for. The receiver 100 then determines from the received SIB1-BR message whether the network is suitable for connection at step 212 by comparing a signal quality metric to a threshold. This signal quality metric may, for example, be the SNR, block error rate (BER), bit error rate (BIR), or some other metric for measuring the quality of the network to determine whether it is sufficient for connection.

If the receiver 100 determines at step 212 that the network is not suitable, it returns to step 202 and searches for a new network. However, if the network is deemed suitable at step 212, the receiver 100 calibrates the synthesiser 106 at step 214 for the other narrowbands not previously calibrated for.

Once the synthesiser 106 is calibrated for all of the narrowbands, with the calibration data being stored in memory 302, the receiver 100 receives incoming data at step 216. When receiving the data, the receiver 100 may be required to change the reception frequency, e.g. each subframe, which involves re-tuning the synthesiser 106. Rather than performing the calibration during the OFDM symbols 38 that are typically used by legacy LTE for the physical downlink control channel (PDCCH) as in the conventional process described previously with reference to FIG. 4, the calibration data is stored for all of the narrowbands such that, when frequency hopping, the synthesiser 106 can be readily tuned using the existing calibration data.

At step 220, the receiver 100 determines whether more data is to be received. If no further data is to be received, the process ends 222. However, if more data is to be received, the receiver 100 determines whether recalibration is necessary at step 224. This determination at step 224 may involve determining whether the operating temperature and/or operating voltage have changed greatly since the last calibration, or if a predetermined period of time has elapsed.

If no recalibration is necessary, the receiver 100 returns to step 216 and continues to receive data using the current calibration information. If, however, recalibration is required, recalibration is performed for one or more frequencies at step 226 before the receiver returns to step 216 to receive more data.

It will be appreciated that the receiver 100 may determine that recalibration is necessary while receiving data, and perform any necessary calibration before hopping frequency (i.e. using the conventional approach) if this is ultimately necessary.

Those skilled in the art will appreciate that the normal protocol of operation may contain time gaps, for example between reception and transmission (or vice versa), or between subsequent receptions, which may be utilized for calibration.

Thus it will be appreciated by those skilled in the art that embodiments of the present invention provide an improved method of initialising a radio receiver device where precalibration of a synthesiser is performed for a number of different reception frequencies, wherein a sub-set of frequencies are calibrated for first such that the receiver can determine if the network is suitable before calibrating for the other frequencies, potentially saving time, processing resources, and/or power.

Those skilled in the art will appreciate that the specific embodiments described herein are merely exemplary and that many variants within the scope of the invention are envisaged.

The invention claimed is:

1. A method of operating a radio receiver device arranged to receive a plurality of data symbols transmitted on one or more frequencies from a predetermined set of frequencies, the method comprising:

receiving a first set of data symbols at a first transmission frequency, wherein said first set of data symbols comprises a message indicating a first frequency sub-set comprising one or more frequencies selected from said predetermined set of frequencies;
calibrating a synthesiser for the one or more frequencies in said first frequency sub-set;
receiving a second set of data symbols transmitted on at least one of said one or more frequencies from the first sub-set;
determining from the second set of data symbols whether a network quality metric exceeds a threshold;
calibrating the synthesiser for one or more frequencies in a second frequency sub-set when the network quality metric exceeds the threshold, wherein the second frequency sub-set comprises frequencies of the predetermined set of frequencies that are not in the first frequency sub-set.

2. The method as claimed in claim 1, wherein the network quality metric comprises a signal to noise ratio, a block error rate, and/or a bit error rate.

3. The method as claimed in claim 1, comprising carrying out cellular radio communications.

4. The method as claimed in claim 1, comprising storing calibration information associated with each frequency for which the synthesiser is calibrated in a memory; and
retrieving said calibration information when switching to the associated frequency.

5. The method as claimed in claim 1, wherein the synthesiser comprises an oscillator circuit portion, said oscillator circuit portion comprising a phase-locked loop arrangement comprising a voltage controlled oscillator (VCO) and a phase detector arranged in a loop, wherein the method further comprises:
using the phase detector to produce an error signal that depends on a difference between a frequency produced by the voltage controlled oscillator and a reference frequency, wherein the frequency produced by the voltage controlled oscillator depends on the error signal.

6. The method as claimed in claim 5, comprising filtering the error signal to produce a filtered error signal, wherein the frequency produced by the voltage controlled oscillator depends on the filtered error signal.

7. The method as claimed in claim 5, comprising dividing the frequency produced by the voltage controlled oscillator to produce a divided frequency, wherein the error signal depends on a difference between the divided frequency and the reference frequency.

8. The method as claimed in claim 5, wherein the voltage controlled oscillator comprises a plurality of capacitors arranged to form a capacitor matrix, wherein the frequency produced by the voltage controlled oscillator depends on a capacitance of the capacitor matrix, the method comprising applying a control signal to the capacitor matrix to selectively enable one or more of the capacitors such that the capacitance of the capacitor matrix is varied.

9. The method as claimed in claim 8, wherein the step of calibrating the synthesiser comprises:
disconnecting the voltage controlled oscillator from the phase locked loop arrangement;
applying a fixed control voltage to the input of the voltage controlled oscillator;
varying the capacitance of the capacitor matrix;
measuring the frequency produced by the voltage controlled oscillator for plurality of different capacitance values of the capacitor matrix; and determining an optimal capacitance value for the capacitor matrix by comparing the frequency produced by the voltage controlled oscillator to a calibration reference frequency.

10. The method as claimed in claim 1, comprising calibrating the synthesiser for one or more frequencies of the predetermined set of frequencies before receiving a further set of data symbols.

11. The method as claimed in claim 10, comprising comparing an operating temperature of the radio receiver device to a reference temperature and calibrating the synthesiser for one or more frequencies of the predetermined set of frequencies before receiving the further set of data symbols when a difference between the operating temperature and the reference temperature exceeds a temperature difference threshold.

12. The method as claimed in claim 10, comprising comparing an operating voltage of the radio receiver device to a reference voltage and calibrating the synthesiser for one or more frequencies of the predetermined set of frequencies before receiving the further set of data symbols when a difference between the operating voltage and the reference voltage exceeds a voltage difference threshold.

13. A radio receiver device arranged to receive a plurality of data symbols transmitted on one or more frequencies from a predetermined set of frequencies, said radio receiver device comprising a synthesiser, wherein the radio receiver device is arranged to: receive a first set of data symbols at a first transmission frequency, wherein said first set of data symbols comprises a message indicating a first frequency sub-set comprising one or more frequencies selected from said predetermined set of frequencies;
  calibrate the synthesiser for the one or more frequencies in said first frequency sub-set;
  receive a second set of data symbols transmitted on at least one of said one or more frequencies from the first sub-set;
  determine from the second set of data symbols whether a network quality metric exceeds a threshold; and
  calibrate the synthesiser for one or more frequencies in a second frequency sub-set when the network quality metric exceeds the threshold, wherein the second frequency sub-set comprises frequencies of the predetermined set of frequencies that are not in the first frequency sub-set.

14. A radio communication system comprising a radio transmitter device and a radio receiver device, wherein:
  the radio transmitter device comprises a synthesiser and is arranged to transmit a plurality of data symbols on one or more frequencies from a predetermined set of frequencies;
  wherein the radio receiver device is further arranged to:
  receive a first set of data symbols at a first transmission frequency, wherein said first set of data symbols comprises a message indicating a first frequency sub-set comprising one or more frequencies selected from said predetermined set of frequencies;
  calibrate the synthesiser for the one or more frequencies in said first frequency sub-set;
  receive a second set of data symbols transmitted on at least one of said one or more frequencies from the first sub-set;
  determine from the second set of data symbols whether a network quality metric exceeds a threshold; and
  calibrate the synthesiser for one or more frequencies in a second frequency sub-set when the network quality metric exceeds the threshold, wherein the second frequency sub-set comprises frequencies of the predetermined set of frequencies that are not in the first frequency sub-set.

* * * * *